Patented Dec. 26, 1939

2,185,040

UNITED STATES PATENT OFFICE 2,185,040

METHOD OF REFRIGERATION AND ABSORBENT THEREFOR

Harry F. Smith and Charles E. Waring, Dayton, Ohio, assignors to General Motors Corporation, Dayton, Ohio, a corporation of Delaware No Drawing. Application November 30, 1936, Serial No. 113,471

10 Claims. (Cl. 62—179)

Our invention relates to absorption refrigerating apparatus and absorption refrigerating processes as well as to working substances for use in absorption refrigerating apparatus and processes.

Heretofore, in absorption refrigerating apparatus, it has been customary to use either a liquid absorbent such as water, or a solid absorbent such as calcium chloride in combination with a refrigerant such as ammonia.

The use of a liquid absorbent has had a number of objections. One of these results from the fact that there is no definite temperature at which the vapor such as ammonia may be driven from the solution by the application of heat. That is, the temperature at which the vapor such as ammonia is driven from or absorbed by the solution depends upon the concentration of the ammonia in the solution. This is objectionable because it makes the evaporating temperature of the vapor or ammonia within the evaporator of the system rather variable.

The use of liquid absorbents has been practically limited to water, principally because other liquids have had too small an absorption capacity. Water is objectionable because it has a very high specific heat and a great amount of heat energy was required to heat the water in order to expel a comparatively small amount of ammonia from the water, and also a comparatively great amount of heat must be abstracted in order to absorb a comparatively small amount of ammonia in the water. This made liquid absorption apparatus relatively inefficient. The water would also often get into the evaporator and freeze therein. This would cause all sorts of undesirable disturbances in the system.

Likewise, the use of the solid absorbent has also had certain objections. The first one of these objections is the difficulty in transferring heat from the wall of the absorber to the solid absorbent and also from the particles of the solid absorbent near the walls to the particles remote from the walls. There is also a tendency for the solid absorbent to swell during absorption and to migrate from one position in the absorber to another due to the continued swelling and contraction of the solid absorbent during absorption and liberation of the refrigerant therefrom.

It is an object of our invention to provide a process which may be either continuous or intermittent, which will overcome the difficulties with prior processes and apparatuses employing liquid and solid absorbents.

It is another object of our invention to provide an improved absorbing system for absorption refrigerating apparatus and absorption refrigerating process which will have substantially all of the advantages of liquid absorbents and solid absorbents and at the same time eliminate many disadvantages.

It is another object of our invention to provide a high boiling point absorption solution capable of absorbing the relatively large portion of refrigerant at substantially a constant temperature.

It is a further object of our invention to provide a working substance which will improve the heat transfer characteristics as well as the capacity of the generator-absorber without increasing its size.

In carrying out our invention, we propose to utilize as the absorbent a high boiling liquid capable of itself absorbing the refrigerant such as ammonia and having colloidally suspended therein or in solution therein, a metal or salt capable of absorbing large quantities of the refrigerant such as ammonia, preferably by forming addition compounds with the ammonia absorbed. Such an absorbent may be used in either the intermittent or the continuous type of absorption machine. It may be used in the Platen-Munters type of absorption system as well as in the multi-pressure type of system. By the use of such an absorbent material we are able to liberate the ammonia from its combination with the absorbent by the application of heat at a substantially constant dissociation point at a substantially constant temperature which does not vary with the concentration of ammonia. At the same time, we are able to get intimate thermal contact between all of the absorbent material and the walls of the generator-absorber partly because of mobility of the absorbent material by convection to materially aid in the transfer of heat to and from the material within the generator-absorber. We are also able to use a nonfreezing lower specific heat liquid for suspending the solid since the liquid need not have a high absorption capacity because of the fact that the major portion of the absorption is performed by the solid absorbent. In this way and by the use of such an absorbent it is possible to provide a more efficient absorption machine with a considerably smaller absorber.

As examples of the refrigerant we use in carrying out our process, we employ anhydrous ammonia ($NH_3$), anhydrous methylamine ($CH_3NH_2$), or ethylamine ($C_2H_5NH_2$). As examples of the liquid in which the absorbents may be suspended, we refer to tri-ethanolamine, tri-normal-propylamine, tri-normal-butylamine, 1-4 dioxane. All of these may be used with ammonia but 1-4 dioxane is preferably used with methylamine and ethylamine. 1-4 dioxane, sometimes spelled dioxan, has the following formula:

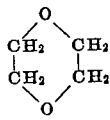

As examples of salts or metals capable of being held in colloidal suspension in the liquid, we refer to metallic calcium, strontium chloride, magnesium chloride, all of which are preferably used with ammonia as the refrigerant, while zinc, cobalt, nickel and iron chlorides may be used with 1-4 dioxane as the suspending liquid and with methylamine as a refrigerant, and nickel chloride and cobalt iodide may be used when 1-4 dioxane is the suspending liquid and ethylamine is used as the refrigerant. These solids are preferably held in colloidal suspension within the liquids. They will form addition compounds when in contact with the refrigerant with which they are associated. These solids will form higher addition products at low temperatures and at higher temperatures some or all of the added radicals will be driven off to form lower addition compounds or compounds without any products of addition.

In making up the colloidal suspension of the solid absorbent in the liquid absorbent, it is only necessary to have enough liquid to provide a liquid film between the particles of the solid absorbent, when the absorbent is to be used in an intermittent type of absorption machine. When used in a continuous type of absorption machine, sufficient liquid is used with the colloidally suspended solid absorbent to permit the absorbent solution to flow wherever desired in the system.

As one example of our process, we cool a colloidal suspension of unsaturated strontium chloride in triethanolamine located in the presence of ammonia vapor in communication with condensed ammonia in a closed system. This cooling causes the triethanolamine to absorb the ammonia vapor, which is evaporated from the condensed ammonia. The colloidal particles of strontium chloride extract the ammonia from the triethanolamine to form addition compounds or amines. In this process the strontium chloride and the triethanolamine becomes wholly or partially saturated with ammonia. Thereafter, we heat the charged triethanolamine containing the wholly or partially saturated strontium chloride to drive off ammonia therefrom at a comparatively high pressure and at the same time we cool the ammonia and cause it to be condensed. The cooling and heating of the strontium chloride provides refrigeration during the cooling of the strontium chloride and triethanolamine. In this process the triethanolamine acts mainly as a transferring agent between the ammonia vapor and the strontium chloride and is employed only to a limited extent as an absorbent.

This process may be used in a continuous type machine wherein a separate generator and separate absorber is provided and where the charged triethanolamine containing strontium chloride in colloidal suspension is transferred to the generator and the discharged triethanolamine containing strontium chloride with relatively little ammonia in combination is transferred to an absorber. It may be also used in single or twin generator intermittent type of absorption refrigerating system employing a generator-absorber which is intermittently heated and cooled. Instead of strontium chloride, strontium bromide, metallic calcium, magnesium chloride, calcium chloride or any substances capable of absorbing ammonia from the triethanolamine may be employed. Instead of triethanolamine, tri-normal-propylamine, tri-normal-butylamine or 1-4 dioxane may be used.

As another example of our invention, we cool 1-4 dioxane containing zinc chloride as a colloidal suspension therein in the presence of methylamine ($CH_3.NH_2$) vapor, to cause the methylamine vapor to be absorbed by the dioxane and the methylamine to be extracted from the dioxane and absorbed by the zinc chloride to form a product of addition. The methylamine vapor is derived from condensed methylamine with which it is in communication. Then we heat the dioxane containing the zinc chloride to drive the methylamine in vapor form from the zinc chloride into the dioxane and out of the dioxane and at the same time cool this methylamine vapor until it condenses. We continue the cooling and heating to provide refrigeration. Instead of zinc chloride there may be used cobalt, nickel, or iron chlorides.

As a third example, we cool 1-4 dioxane containing cobalt iodide ($CoI_2$) as a colloidal suspension therein in the presence of ethylamine ($C_2H_5NH_2$) vapor. This causes the dioxane to absorb the ethylamine vapor and causes the cobalt iodide to extract the ethylamine from the dioxane to form a product of addition. The ethylamine vapor is supplied by the evaporation of the condensed ethylamine with which it communicates to provide refrigeration. Thereafter, the rich dioxane containing the wholly or partially saturated cobalt iodide is heated to drive the ethylamine from the cobalt iodide to the dioxane and out of the dioxane after which the ethylamine is cooled and condensed under pressure. Instead of cobalt iodide, nickel chloride may be used.

The liquids employed herein have relatively high boiling points as well as a much lower specific heat than water and will not form objectionable accumulations in the colder portions of the system. By providing solid absorbents as a colloidal suspension in these liquids, the absorbents have more the characteristics of a solid absorbent in their generating and absorption aspects and particularly have a much higher absorption capacity. That is, they emit large amounts of the refrigerant at a substantially constant temperature and they absorb large amounts of the refrigerant at a substantially constant temperature. Good heat transfer is obtained because the liquid provides a suitable conducting medium for conducting heat to and from the colloidally suspended solid absorbents. The liquid permits the free movement, expansion and contraction of the solid absorbents in colloidal suspension so that even though only a small amount of liquid is present, the generator and absorber are prevented from being distorted by this action.

It is not necessary that the liquid used for the colloidal suspension of the solid absorbents have a high absorption capacity, since the major portion of the absorption capacity lies in the solid absorbent which can absorb a relatively high amount of refrigerant in proportion to its weight. Its major function is to serve as a carrying agent. Only sufficient liquid need be used to provide a film between the particles of solid absorbent when the substance is used in an intermittent type of absorption machine. Where the substance is used in a continuous type of absorption machine, the substance must be made sufficiently liquid to be easily circulated without loss of the colloidally suspended solid material.

While the form of embodiment of the invention as herein disclosed, constitutes a preferred form, it is to be understood that other forms might be adopted, all coming within the scope of the claims which follow.

What is claimed is as follows:

1. The process which comprises absorbing a gas into a liquid and chemically absorbing the gas from the liquid into a solid colloidally suspended within the liquid; then driving the gas from the solid into the liquid and then out of the liquid, said solid having no chemical or physical affinity for the liquid or any chemical radical in the chemical structure of the liquid, said liquid remaining in liquid state throughout the absorbing and generating cycles.

2. The process which comprises evaporating a condensed vapor, absorbing the vapor into a liquid and chemically absorbing the vapor from the liquid into a solid colloidally suspended in the liquid, then heating the liquid containing the solid to drive the vapor from the solid into the liquid and out of the liquid; then condensing the vapor, said solid having no chemical or physical affinity for the liquid or any chemical radical in the chemical structure of the liquid, said liquid remaining in liquid state throughout the absorbing and generating cycles.

3. A working substance for an absorption apparatus comprising a triethanolamine having strontium chloride in suspension.

4. A working substance for an absorption apparatus comprising a 1-4 dioxane having zinc chloride suspended therein.

5. A working substance for an absorption apparatus comprising a 1-4 dioxane having cobalt iodide suspended therein.

6. The process of transferring heat employing a condensable vapor and an absorbent for the condensable vapor comprising a liquid capable of absorbing the vapor and a solid colloidally suspended within the liquid capable of chemically absorbing the condensable vapor from the liquid to form a true chemical compound, said process comprising cooling the absorbent to absorb the vapor from condensed vapor into the liquid and to chemically absorb the vapor from the liquid in the solid to form a true chemical compound; then heating the absorbent to drive off the vapor from the solid into the liquid and thence out of the liquid; and finally recondensing the vapor, said solid having no chemical or physical affinity for the liquid or any chemical radical in the chemical structure of the liquid, said liquid remaining in liquid state throughout the absorbing and generating cycles.

7. The process employing a heat transfer vapor and an absorbent comprising a liquid capable of absorbing the heat transfer vapor and a solid colloidally suspended in the liquid capable of taking the heat transfer vapor from the liquid to form chemical addition compounds therewith which comprises first cooling an absorbent comprising a liquid containing a solid material suspended therein, to cause the liquid to absorb the heat transfer vapor and to cause the solid material to take the vapor from the liquid and form chemical addition compounds therewith; and then heating the absorbent to drive the vapor from the solid material to the liquid and then out of the liquid, said solid having no chemical or physical affinity for the liquid or any chemical radical in the chemical structure of the liquid, said liquid remaining in liquid state throughout the absorbing and generating cycles.

8. The process which comprises evaporating condensed ammonia, absorbing the ammonia vapor into triethanolamine and absorbing the ammonia from the triethanolamine into strontium chloride colloidally suspended in the triethanolamine; then heating the triethanolamine containing the strontium chloride to drive the ammonia from the strontium chloride into the triethanolamine and out of the triethanolamine; then condensing the ammonia.

9. The process which comprises evaporating methylamine, absorbing the evaporated methylamine into 1-4 dioxane and absorbing the methylamine from the 1-4 dioxane into zinc chloride colloidally suspended in the 1-4 dioxane; then heating the 1-4 dioxane containing the zinc chloride to drive the methylamine from the zinc chloride into the 1-4 dioxane and out of the 1-4 dioxane; then condensing the methylamine.

10. The process which comprises evaporating ethylamine, absorbing the evaporated ethylamine into 1-4 dioxane and absorbing the ethylamine from the 1-4 dioxane into cobalt iodide colloidally suspended in the 1-4 dioxane; then heating the 1-4 dioxane containing the cobalt iodide to drive the ethylamine from the cobalt iodide into the 1-4 dioxane and out of the 1-4 dioxane; then condensing the ethylamine.

HARRY F. SMITH.
CHARLES E. WARING.